(12) United States Patent
Toyose

(10) Patent No.: US 7,163,360 B2
(45) Date of Patent: Jan. 16, 2007

(54) CUTTER BODY, ROTARY TOOL, AND METHOD FOR ASSEMBLING THE ROTARY TOOL

(75) Inventor: Hidenori Toyose, Aichi (JP)

(73) Assignee: NGK Spark Plug Co., Ltd., Aichi (JP)

( * ) Notice: Subject to any disclaimer, the term of this patent is extended or adjusted under 35 U.S.C. 154(b) by 0 days.

(21) Appl. No.: 10/807,345

(22) Filed: Mar. 24, 2004

(65) Prior Publication Data

US 2004/0191009 A1   Sep. 30, 2004

(30) Foreign Application Priority Data

Mar. 26, 2003 (JP) ............ 2003-086390
Feb. 18, 2004 (JP) ............ 2004-041229

(51) Int. Cl.
*B23C 5/22* (2006.01)

(52) U.S. Cl. .............. 407/36; 407/44; 407/46

(58) Field of Classification Search .......... 407/46, 407/34, 40, 101, 36, 37, 44, 48, 88, 92; 411/376, 411/377, 372.6, 910, 410, 292

See application file for complete search history.

(56) References Cited

U.S. PATENT DOCUMENTS

| 2,576,786 | A | * | 11/1951 | Gray et al. .................... 408/84 |
|---|---|---|---|---|
| 3,425,313 | A | * | 2/1969 | Villo ............................. 411/373 |
| 3,839,772 | A | | 10/1974 | Shimomura et al. |
| 3,997,951 | A | | 12/1976 | Williscraft |
| 4,318,874 | A | * | 3/1982 | Lemelson .................. 264/40.1 |
| 4,459,074 | A | * | 7/1984 | Capuano ..................... 411/403 |
| 4,887,951 | A | * | 12/1989 | Hashimoto ............... 411/371.1 |
| 5,018,921 | A | * | 5/1991 | Pinney ....................... 411/393 |
| 5,228,811 | A | * | 7/1993 | Potter .......................... 408/84 |
| 5,577,871 | A | * | 11/1996 | Brugola ..................... 411/404 |
| 5,620,639 | A | * | 4/1997 | Stevens et al. ............... 264/85 |
| 5,651,651 | A | * | 7/1997 | Spencer ................... 411/372.6 |
| 5,667,343 | A | * | 9/1997 | Hessman et al. ............ 407/36 |
| 6,086,290 | A | * | 7/2000 | Qvarth et al. ................ 407/38 |
| 6,086,972 | A | * | 7/2000 | Rayburn et al. ........... 428/40.1 |
| 6,634,842 | B1 | * | 10/2003 | Ueno ......................... 411/377 |

FOREIGN PATENT DOCUMENTS

| DE | 379 059 C | 8/1923 |
|---|---|---|
| DE | 2 140 004 A1 | 2/1973 |
| JP | 2000-015503 A | 1/2000 |

\* cited by examiner

*Primary Examiner*—Monica Carter
*Assistant Examiner*—Sara Addisu
(74) *Attorney, Agent, or Firm*—Sughrue Mion, PLLC

(57) ABSTRACT

A cutter body which includes cartridges 11 for allowing corresponding cutting inserts 9 to be removably fixed thereto, a cutter body member 3, second screws (cartridge fixation screws 17) for fixing the corresponding cartridges 11 to the cutter body member 3, and adjustment screws 19 for adjusting the positions of the corresponding cartridges 11. A wrench reception socket 51 of each of the fastened second screws 17 and/or a wrench reception socket 50 of each of the adjustment-completed adjustment screws 19 is sealed. A rotary tool (milling cutter 1) is configured such that the cutting inserts 9 are fixed to the corresponding cartridges 11 of the cutter body.

8 Claims, 12 Drawing Sheets

CUTTER BODY, ROTARY TOOL, AND METHOD FOR ASSEMBLING THE ROTARY TOOL

BACKGROUND OF THE INVENTION

1. Field of the Invention

The present invention relates to a cutter body and a rotary tool for use in milling, as well as a method for assembling the rotary tool.

2. Description of the Related Art

Cutters and end mills having a plurality of cutting edges are conventionally known. In these tools, when cutting inserts are mounted, the cutting edge height may vary among the mounted cutting inserts. This is because the cutting edge height varies depending on the fabrication accuracy of cutters and cutting inserts. When a tool is applied to cutting while the cutting inserts differ in cutting edge height, satisfactory surface roughness may fail to be obtained, or the life of the tool may be shortened. Particularly, in the case of cutting inserts each having a diamond cutting edge, an irregular cutting edge height causes concentration of load on a particular cutting insert. As a result, the life of that cutting insert is highly likely to be shortened because of low toughness. In many cases, a rotary tool for cutting an aluminum workpiece is rotated at high speed and is thus highly susceptible to an irregular cutting edge height among cutting inserts.

In order to reduce surface roughness (e.g., Rz), a conventionally used milling cutter or end mill allows the position of a cartridge to be adjusted in the height direction. FIG. 12 shows an example of such an adjustment mechanism. An adjustment screw 60 is provided substantially perpendicular to the direction of adjustment. Movement of the adjustment screw 60 is transmitted to a taper portion 62 of a cartridge 61 so as to move the cartridge 61 in the direction of adjustment, thereby adjusting the cutting edge height (see Japanese Patent Application Laid-Open (kokai) No. 200-15503). In FIG. 12, reference numeral 63 denotes a cutter body; reference numeral 64 denotes a cartridge fixation screw for fixing the cartridge 61 to the cutter body 63; reference numeral 65 denotes a cutting insert; reference numeral 66 denotes an insert attachment screw for fixing the cutting insert 65 to the cartridge 61; and reference numeral 67 denotes an L-shaped wrench, which is inserted into a wrench reception socket 68 of the adjustment screw 60 and rotated.

In the thus-configured rotary tool, once the cartridges 61 undergo positional adjustment, after the cutting insert 65 is replaced, no further positional adjustment is necessary for the cartridges 61, since the cutting inserts 65 have excellent dimensional accuracy. Thus, the tool can be used while a regular cutting edge height is maintained.

3. Problems to be Solved by the Invention

However, when the adjustment screw 60 or the cartridge fixation screw 64 in an adjustment mechanism section is mistakenly moved, established adjustment is disturbed, potentially resulting in a need to readjust by use of a highly accurate apparatus.

SUMMARY OF THE INVENTION

It is therefore an object of the present invention to provide a cutter body and a rotary tool free from accidental movement of an adjustment screw and a cartridge fixation screw.

The above object of the present invention has been achieved by providing (1) a cutter body comprising a cartridge for allowing a cutting insert to be removably fixed thereto, a cutter body member, a second screw for fixing the cartridge to the cutter body member, and an adjustment screw for adjusting the position of the cartridge, wherein one or both of a wrench reception socket of the fastened second screw and a wrench reception socket of the adjustment-completed adjustment screw is sealed.

In a preferred embodiment, the present invention provides (2) a cutter body according to (1) above, wherein one or both of the wrench reception socket of the second screw and the wrench reception socket of the adjustment screw is sealed with a resin.

In yet another preferred embodiment, the present invention provides (3) a cutter body according to (2) above, wherein one or both of the wrench reception socket of the second screw and the wrench reception socket of the adjustment screw is roughened on at least an inner wall surface thereof.

In yet another preferred embodiment, the present invention provides (4) a cutter body according to (2) or (3) above, wherein one or both of the wrench reception socket of the second screw and the wrench reception socket of the adjustment screw is narrowed toward an opening thereof.

In yet another preferred embodiment, the present invention provides (5) a cutter body according to (1) above, wherein one or both of the wrench reception socket of the second screw and the wrench reception socket of the adjustment screw is deformed so as to seal the same.

In yet another preferred embodiment, the present invention provides (6) a cutter body comprising a cartridge for allowing a cutting insert to be removably fixed thereto by use of a first screw, a cutter body member, a second screw for fixing the cartridge to the cutter body member, and an adjustment screw for adjusting the position of the cartridge, wherein one or both of a wrench reception socket of the second screw and a wrench reception socket of the adjustment screw assumes a shape that does not fit a wrench for use with the first screw and fits only a wrench other than an Allen wrench, a Phillips screwdriver, and a flat-tip screwdriver.

In yet another preferred embodiment, the present invention provides (7) a rotary tool comprising the cutter body as described in any of (1) to (6) above, and a cutting insert fixed to the cartridge of the cutter body.

In yet another preferred embodiment, the present invention provides (8) a rotary tool according to (7) above, wherein a cutting edge of the cutting insert is formed of diamond.

In yet another preferred embodiment, the present invention provides (9) a rotary tool according to (7) or (8) above, wherein the rotary tool is used for cutting an aluminum workpiece.

In yet another preferred embodiment, the present invention provides (10) a method for assembling a rotary tool as described in any of (7) to (9) above, comprising a cutting insert fixation step of fixing the cutting insert to the cartridge, a cartridge fixation step of fixing the cartridge to the cutter body member by use of the second screw, an adjustment step of adjusting the position of the cartridge by use of the adjustment screw, and a sealing step of sealing one or both of the wrench reception socket of the second screw and the wrench reception socket of the adjustment screw, wherein the sealing step is performed after the cartridge fixation step and/or the adjustment step.

As used herein, "assembly" of a rotary tool includes assembly associated with fabrication and assembly associated with readjustment.

1. Effect of the Invention

In the cutter body of (1) above, the wrench reception socket of the fastened second screw and/or that of the adjustment-completed adjustment screw is sealed. Thus, for example, when the cutting insert is to be replaced, a wrench is not inserted into the wrench reception socket of the adjustment screw or into that of the second screw. Therefore, the adjustment screw or the second screw is not rotated by mistake, thereby preventing an accidental change in the cutting edge height of the cutting insert.

In the case where, as described in (2) above, the wrench reception socket is filled with resin, such as silicone rubber, so as to be sealed, when readjustment becomes necessary, unsealing can be readily performed. Thus, adjustment and sealing can be repeated any number of times. No particular limitation is imposed on the sealing resin. However, silicone rubber is preferred, because of good balance between fluidity and viscosity and good balance between adhesiveness and removability.

In the case where, as described in (3) above, the wrench reception socket is roughened on at least an inner wall surface, since the resin is caught in the roughened surface, an anchor effect is produced, thereby preventing the resin from coming off of the wrench reception socket, which could otherwise result from high-speed rotation.

The cutter body of (4) above can also prevent the resin from coming off of the wrench reception socket, which could otherwise result from high-speed rotation.

In the case where, as described in (5) above, the wrench reception socket is deformed so as to be sealed, additional material cost is not incurred.

Specifying the shape of the wrench reception socket as described in (6) above can also yield an effect similar to that of sealing the wrench reception socket.

In the rotary tool of (7) above, the wrench reception socket of the adjustment screw and/or that of the second screw is sealed. Thus, for example, when the cutting insert is to be replaced, a wrench is not inserted into the wrench reception socket of the adjustment screw or into that of the second screw. Therefore, the adjustment screw or the second screw is not rotated by mistake, thereby preventing an accidental change in the cutting edge height of the cutting insert. This effect is markedly obtained when the cutting edge of the cutting insert is formed of diamond as described in (8) above or in the case of a rotary tool that is used for cutting an aluminum workpiece as described in (9) above.

In the assembling method of (10) above, the sealing process is provided after the adjustment process. Thus, for example, when the cutting insert is to be replaced, a wrench is not inserted into the wrench reception socket of the adjustment screw or into that of the second screw. Therefore, the adjustment screw or the second screw is not rotated by mistake, thereby preventing an accidental change in the cutting edge height of the cutting insert.

DESCRIPTION OF REFERENCE NUMERALS

Figure 1:
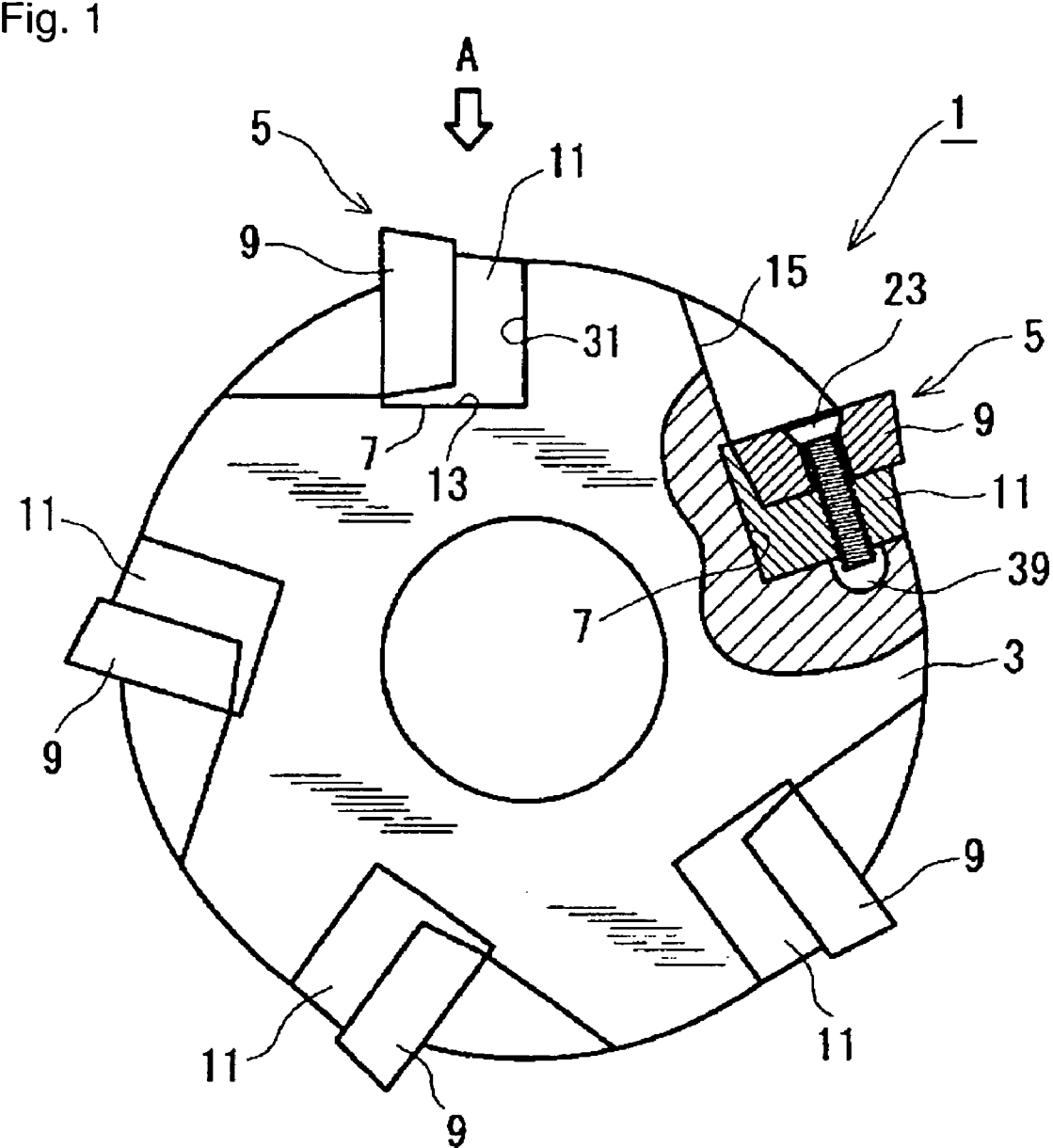
FIG. 1 is a front view of a milling cutter as viewed in the axial direction.

1 . . . milling cutter (rotary tool)
1a . . . cutter body
3 . . . cutter body member
9 . . . cutting insert
11 . . . cartridge
17 . . . cartridge fixation screw (second screw)
19 . . . adjustment screw
23 . . . insert attachment screw (first screw)
25 . . . insert attachment threaded-hole
29 . . . cartridge bottom portion
50 . . . wrench reception socket (adjustment screw)
51 . . . wrench reception socket (second screw)
52 . . . resin

DESCRIPTION OF THE PREFERRED EMBODIMENTS

A cutter body, a rotary tool, and an assembly method according to an embodiment of the present invention will next be described with reference to the drawings. However, the present invention should not be construed as being limited thereto. Herein, a milling cutter will be described as an example of the rotary tool of the present invention.

a) First, a milling cutter will be described.

Figure 2:
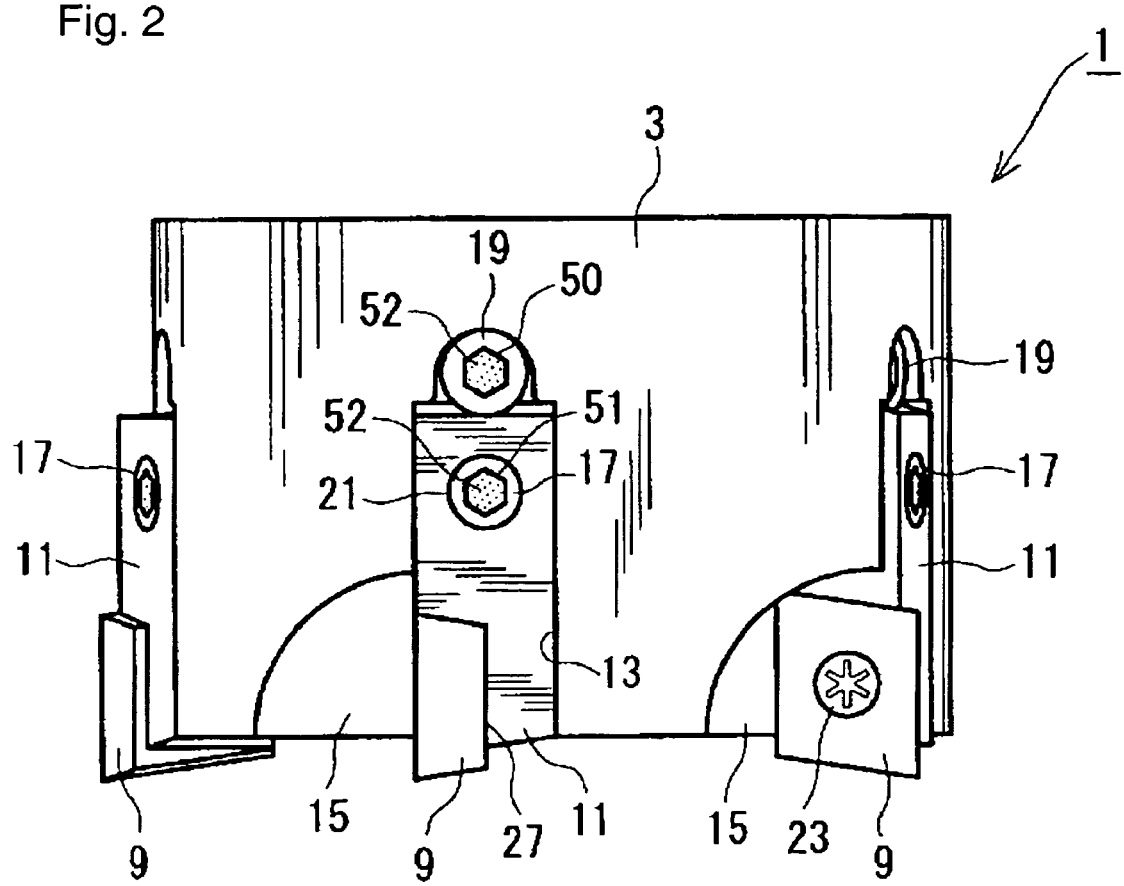
FIG. 2 is a plan view of the milling cutter.

As shown in FIGS. 1 and 2, a milling cutter 1 of the present embodiment includes a substantially cylindrical cutter body member 3 made of an alloy steel (SCM435, per JIS G4105, 1979). Five cutting sections 5 are provided circumferentially on a distal end portion (a portion located toward the near side in FIG. 1) of the cutter body member 3.

Specifically, five attachment recesses 7 (see FIG. 4) are provided circumferentially on a distal end portion of the cutter body member 3. Members, such as a cutting insert (hereinafter referred to as an "insert") 9 made of carbide and a cartridge 11 which is made of an alloy steel (SCM435, per JIS G4105, 1979) and to which the insert 9 is attached, are disposed in each of the attachment recesses 7, thereby forming each of the cutting sections 5.

Figure 4:
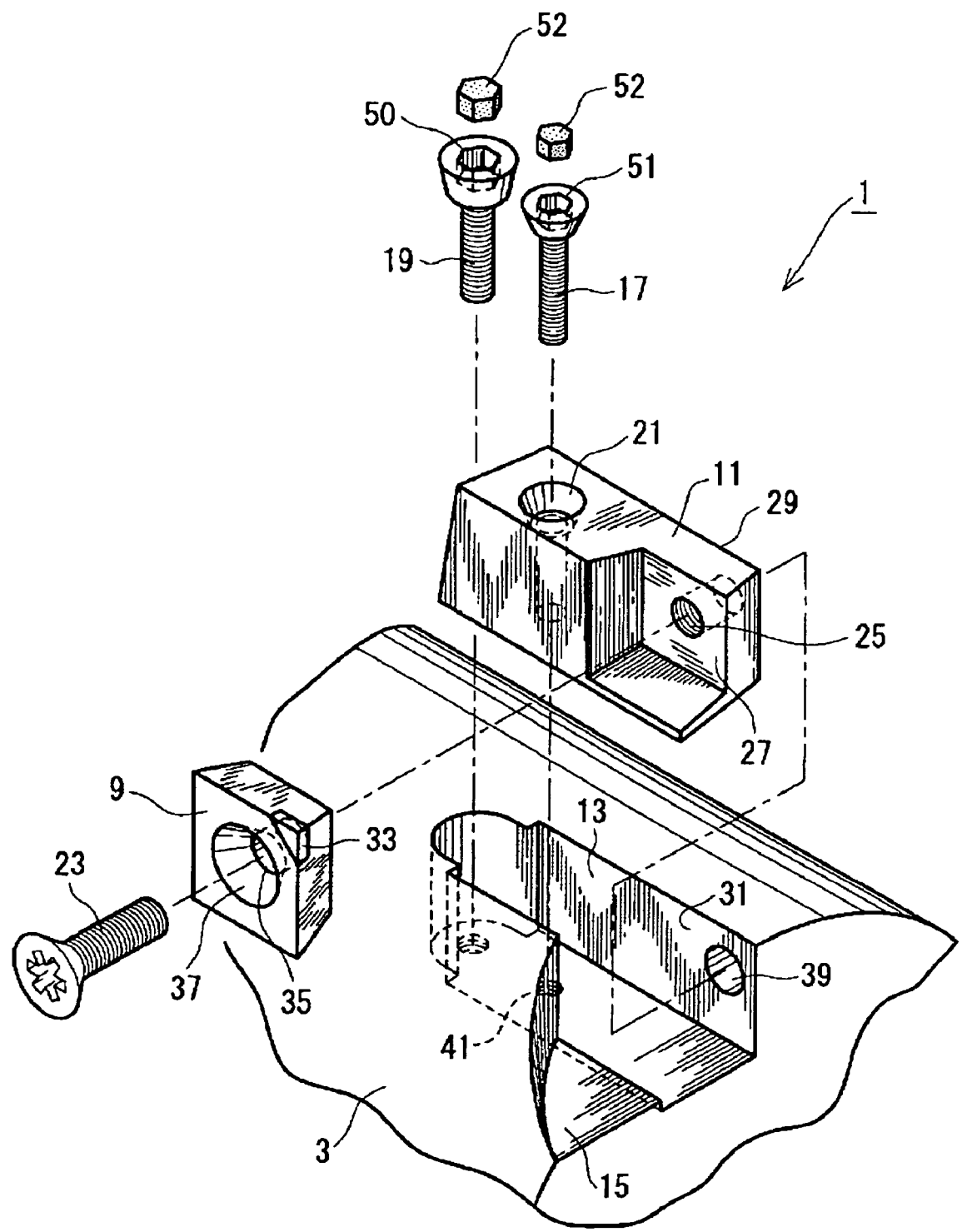
FIG. 4 is an exploded perspective view showing the main portion of the milling cutter.

As shown in FIG. 4, each of the attachment recesses 7 consists of an axially elongated first recess 13 and a second recess 15, which extends circumferentially from a distal end portion of the first recess 13.

The first recess 13 is a groove, whose right and left side wall surfaces (extending along the axial direction of the milling cutter 1) are substantially parallel with each other and whose cross section (taken perpendicularly to the axial direction) is shaped like the letter U. The cartridge 11 to which the insert 9 is attached is fixed by fastening from above (from the near side in FIG. 2) a cartridge fixation screw 17, which serves as the second screw in the present invention. In the first recess 13, an adjustment screw 19 is provided on the rear side (on the upper side in FIG. 2) of the cartridge 11 and used to finely adjust the position of the cartridge 11 in the front-and-rear direction (in the vertical direction in FIG. 2).

As shown in FIG. 4, the cartridge 11 is a member shaped like a quadrangular prism. The cartridge 11 is moved along the above-mentioned wall surfaces of the first recess 13 in a radial direction of the milling cutter 1 (in the direction of arrow A in FIG. 1) to thereby be fitted into the first recess 13.

Figure 3:
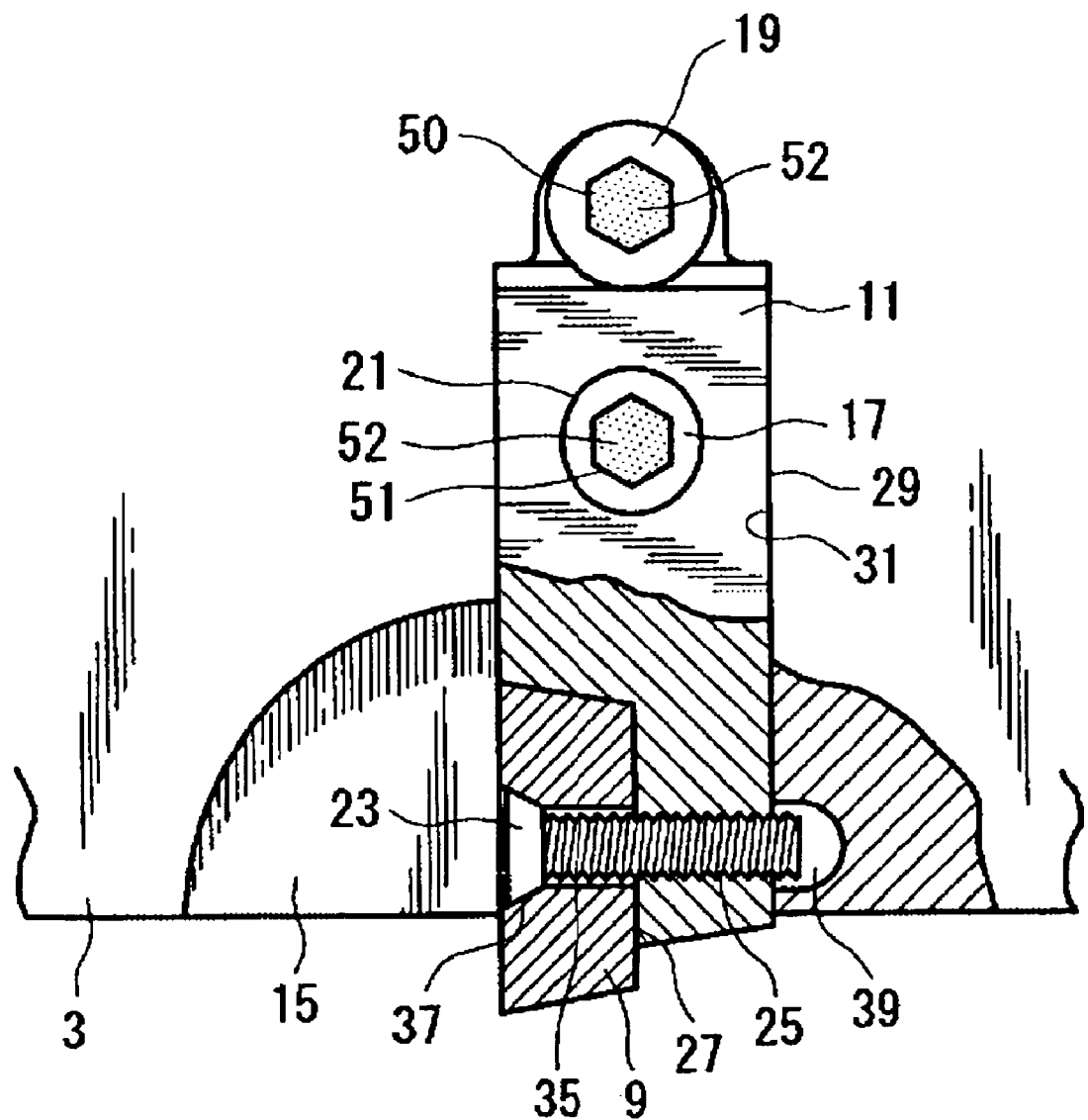
FIG. 3 is an enlarged cutaway front view showing a main portion of the milling cutter.

As shown in FIGS. 3 and 4, a through-hole 21, through which the cartridge fixation screw 17 is inserted, is formed in the cartridge 11 in a radial direction (in the direction perpendicular to the paper of FIG. 3) of the cutter body member 3. Furthermore, an insert attachment threaded-hole 25 is formed in the cartridge 11 in the direction (in the horizontal direction in FIG. 3) tangent to the cutter body member 3. An insert attachment screw 23, which serves as the first screw in the present invention, is screwed into the insert attachment threaded-hole 25 in order to fix the insert 9.

An insert seat 27, which is a substantially quadrangular cutout and on which the insert 9 rests, is formed on the side surface of a distal end portion (a lower end portion in FIG. 3) of the cartridge 11. A bottom portion (a cartridge bottom portion) 29 located on the side (on the right-hand side in FIG. 3) opposite the insert seat 27 abuts a side surface (a seat portion) 31 of the first recess 13 of the cutter body member 3.

As shown in FIG. 4, the insert 9 assumes a substantially quadrangular platelike shape. A cutting tip 33 made of diamond is joined to a distal end corner of the insert 9. A through-hole 35 is formed in the insert 9 at its center in order to allow the insert attachment screw 23 to be inserted therethrough. An opening portion 37 of the through-hole 35 that is located on the top surface side of the insert 9 is tapered.

When the insert attachment screw 23 is inserted through the through-hole 35 of the insert 9 and screwed into the insert attachment threaded-hole 25 of the cartridge 11, the insert 9 is fixed to the cartridge 11.

Particularly, in the present embodiment, as shown in FIG. 3, the insert attachment screw 23 assumes a size (a threaded portion has an outside diameter of 4.0 mm and a length of 12.0 mm) such that its tip projects (e.g., 1.5 mm) from the cartridge bottom portion 29, when the insert 9 is fixed to the cartridge 11.

A reception hole 39, into which a tip portion of the insert attachment screw 23 is inserted, is formed at the seat portion (i.e., a seat portion provided on a side wall of the first recess 13) 31 of the cutter body member 3. The cartridge bottom portion 29 rests on the seat portion 31. The reception hole 39 is a hole into which a tip portion of the insert attachment screw 23 is inserted when the cartridge 11 to which the insert 9 is fixed by fastening the insert attachment screw 23 is fixedly fitted into the first recess 13; i.e., a hole that has a diameter of 5.0 mm, greater than that of the insert attachment screw 23, and a depth of 2.5 mm (a so-called loose fit hole). The reception hole 39 is formed to extend in the axial direction of the insert attachment screw 23.

The second recess 15 is formed so as to provide ample working space for attaching the insert 9 and the cartridge 11 to the cutter body member 3 by means of screw engagement. Specifically, the cutter body member 3 is considerably cut out so as to provide a space at the outside of the insert attachment screw 23 along the axial direction of the insert attachment screw 23 (along a direction tangent to the milling cutter 1) for a screwdriver (not shown) that is used to fasten the insert attachment screw 23 in order to fix the insert 9.

b) Next, a method for assembling the milling cutter 1 will be described.

As shown in FIG. 4, first, the insert 9 is placed on the insert seat 27 of the cartridge 11; the insert attachment screw 23 is inserted through the through-hole 35 of the insert 9; and the insert attachment screw 23 is screwed into the insert attachment threaded-hole 25. At this time, the insert attachment screw 23 is screwed such that its tip does not project from the cartridge bottom portion 29.

Next, the cartridge 11 to which the insert 9 is attached is placed in the first recess 13; and the cartridge fixation screw 17 is inserted through the through-hole 21 of the cartridge 11 and screwed into a cartridge fixation threaded-hole 41. Thus, the cartridge 11 is fixed to the cutter body member 3.

The adjustment screw 19 is fastened in such a manner as to determine the axial position of the cartridge 11.

Next, the insert attachment screw 23 is fastened from the side toward the second recess 15 (i.e., in a direction tangent to the cutter body member 3) by use of a screwdriver, to thereby fixedly press (clamp) the insert 9 against the cartridge 11. At this time, the tip of the insert attachment screw 23 projects from the cartridge bottom portion 29 and is inserted into the reception hole 39 of the seat portion 31 of the cutter body member 3.

Thus, the insert 9 and the cartridge 11 are fixed to the cutter body member 3.

Furthermore, a wrench reception socket 51 of the cartridge fixation screw 17, which serves as the second screw, and a wrench reception socket 50 of the adjustment screw 19 are filled with a fluid resin 52, which is fluid silicone rubber. Subsequently, the resin 52 is allowed to dry at the room temperature for 12–24 minutes, to thereby be cured.

Figure 6:
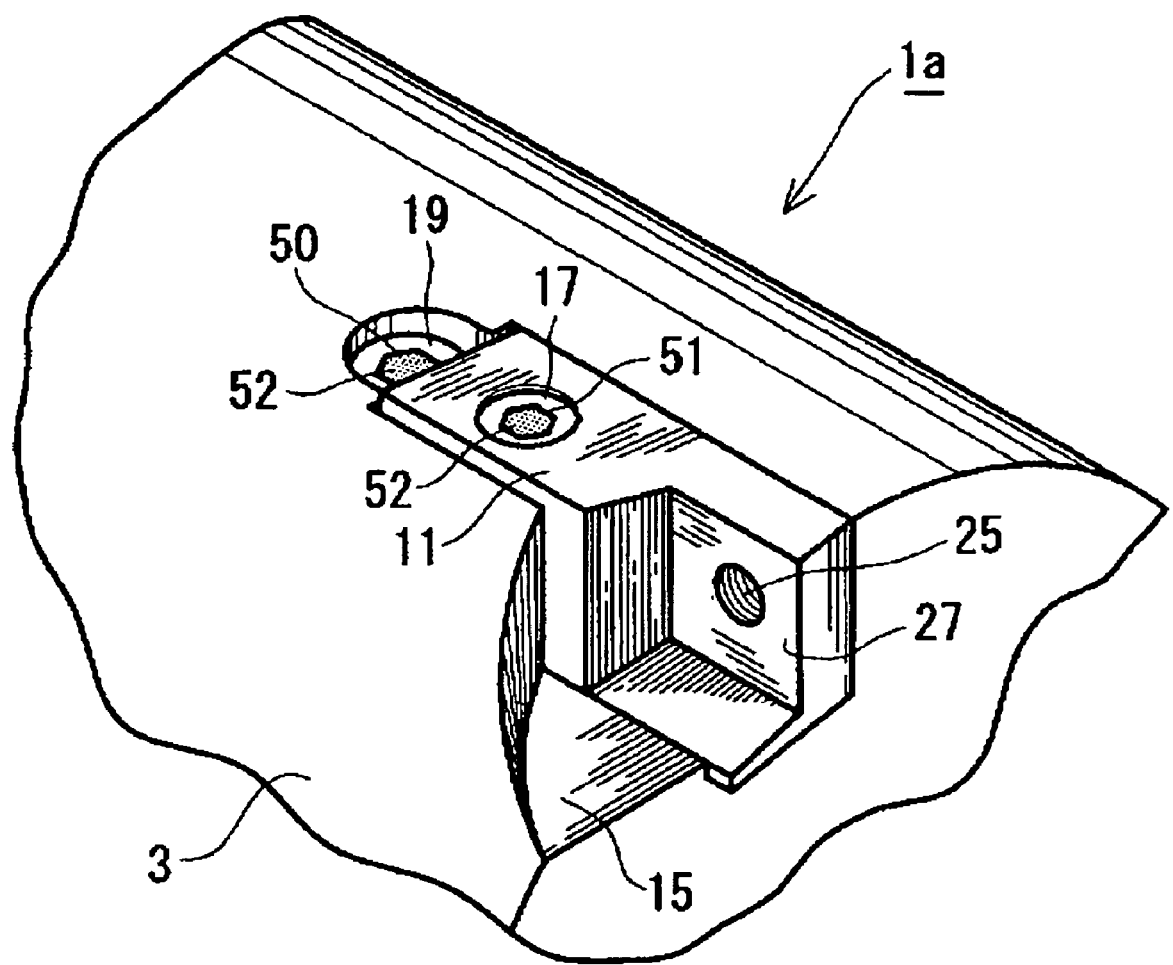
FIG. 6 is a perspective view showing a main portion of a cutter body.

An assembly in this state of the cartridge 11, the cutter body member 3, the cartridge fixation screw 17, the adjustment screw 19, and the resin 52 is a cutter body 1a shown in FIG. 6.

Figure 5:
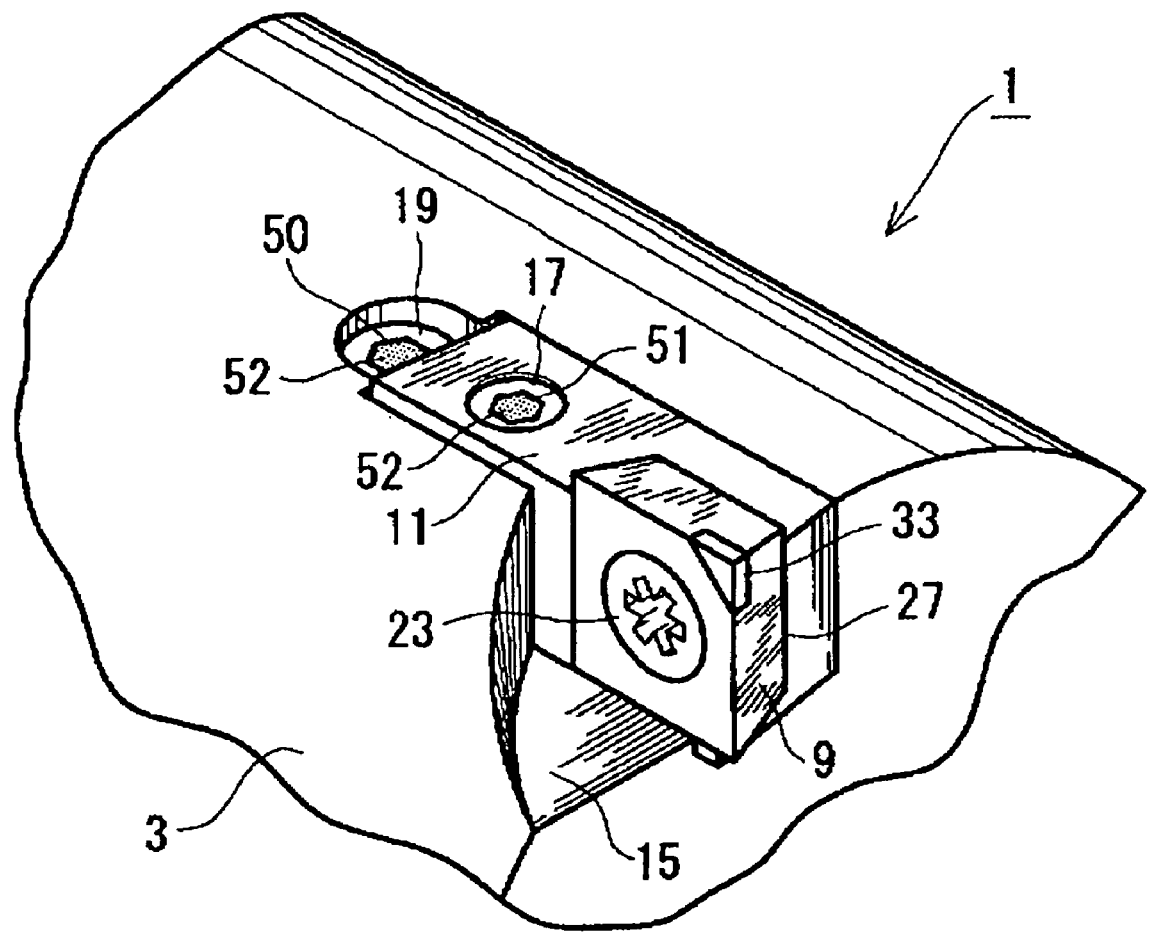
FIG. 5 is a perspective view showing the main portion of the milling cutter.

An assembly of the cutter body 1a, the cutting insert 9, and the insert attachment screw 9 is the milling cutter 1 shown in FIG. 5 and which serves as the rotary tool.

c) Next, the effect of the above-described present embodiment will be described.

In the present embodiment, the wrench reception socket 51 of the second screw and the wrench reception socket 50 of the adjustment screw 19 are filled with the resin 52, which is silicone rubber.

Thus, the wrench reception socket 51 of the second screw and the wrench reception socket 50 of the adjustment screw 19 do not accept a wrench or the like. Therefore, the present embodiment can reliably prevent the following problem or the like: the second screw or the adjustment screw 19 is rotated by mistake, resulting in a change in the cutting edge height of the cutting insert 9.

As described above, the milling cutter 1 of the present embodiment has an accurately regular cutting edge height and can reliably maintain the regular cutting edge height. Therefore, the milling cutter 1 can be reliably used at a high rotational speed of 10,000 rpm as in the case of cutting an aluminum workpiece.

The present invention is not limited to the above-described embodiment, but may be embodied in many other specific forms without departing from the spirit or scope of the invention.

(1) For example, the wrench reception socket 50 (51) may be roughened to a surface roughness Rz of about 10 (JIS B0601, 2001) on at least the inner wall surface. This feature causes the resin 52 to be caught in the roughened surface, thereby producing an anchor effect. Thus, even when the rotary tool is rotated at a high speed of, for example, 10,000 rpm, the resin 52 does not come off.

Figure 7:
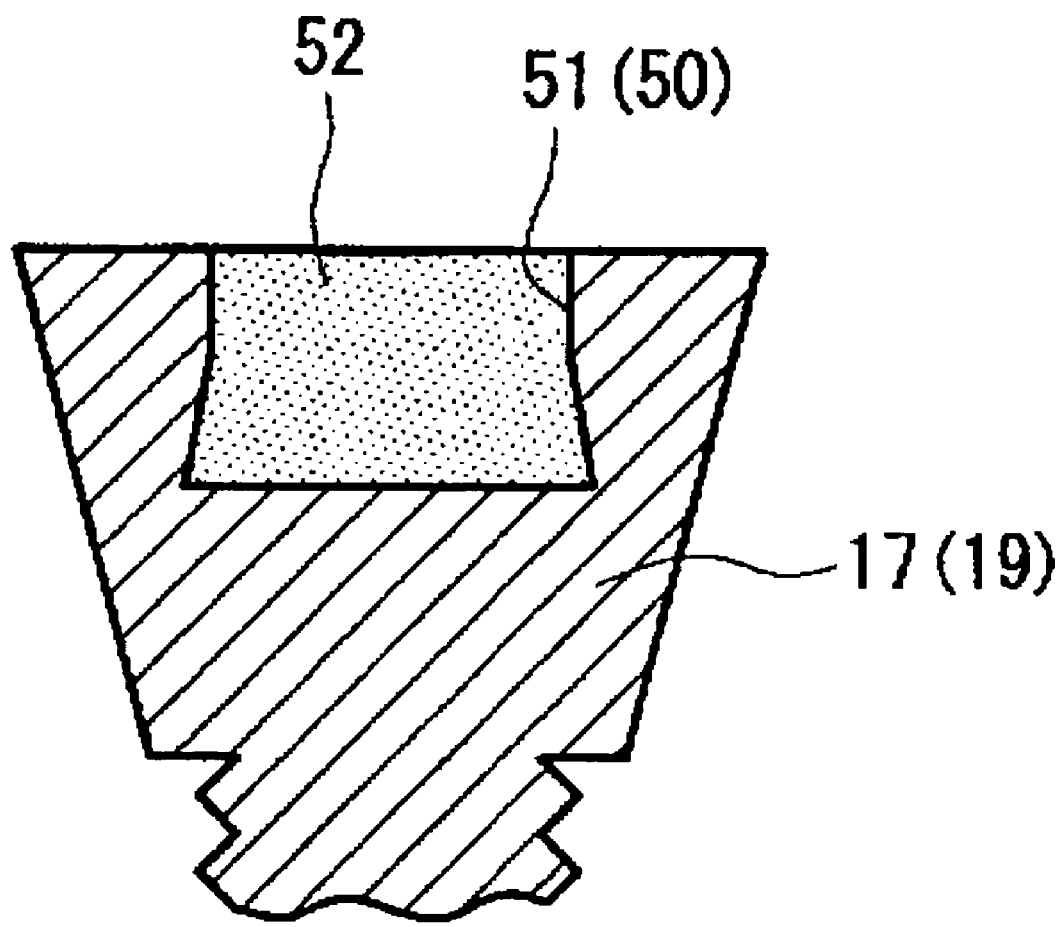
FIG. 7 is an enlarged sectional view showing a main portion of another embodiment of a wrench reception socket.

(2) The wrench reception socket 50 (51) may be narrowed toward their opening, as shown in FIG. 7. This feature can prevent the resin 52 from coming off as in the above case.

Figure 8:
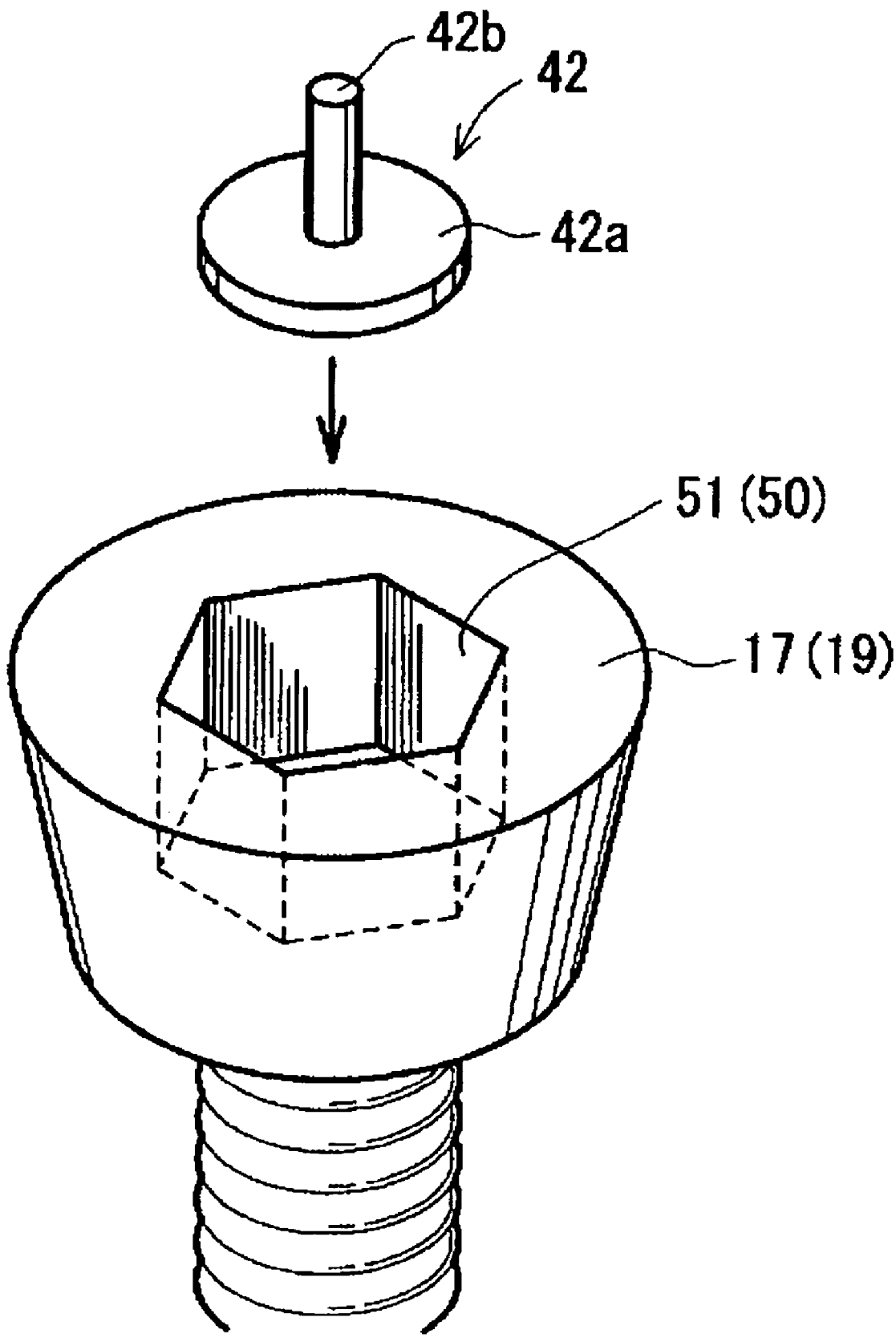
FIG. 8 is an exploded perspective view showing a main portion of a further embodiment of the wrench reception socket.

(3) A pull-out member 42 shown in FIG. 8 may be set in the wrench reception socket 50 (51) before the wrench reception socket 50 (51) is filled with the resin 52. The pull-out member 42 includes an anchor plate 42a and a pin 42b and is formed such that a tip portion of the pin 42b appears in the vicinity of the surface of the cured resin 52. By pulling a tip portion of the pin 42b by use of a tool, the resin 52 can be drawn out together with the anchor plate 42a. Embedding the pull-out member 42 in the resin 52 facilitates removal of the resin 52.

Figure 9:
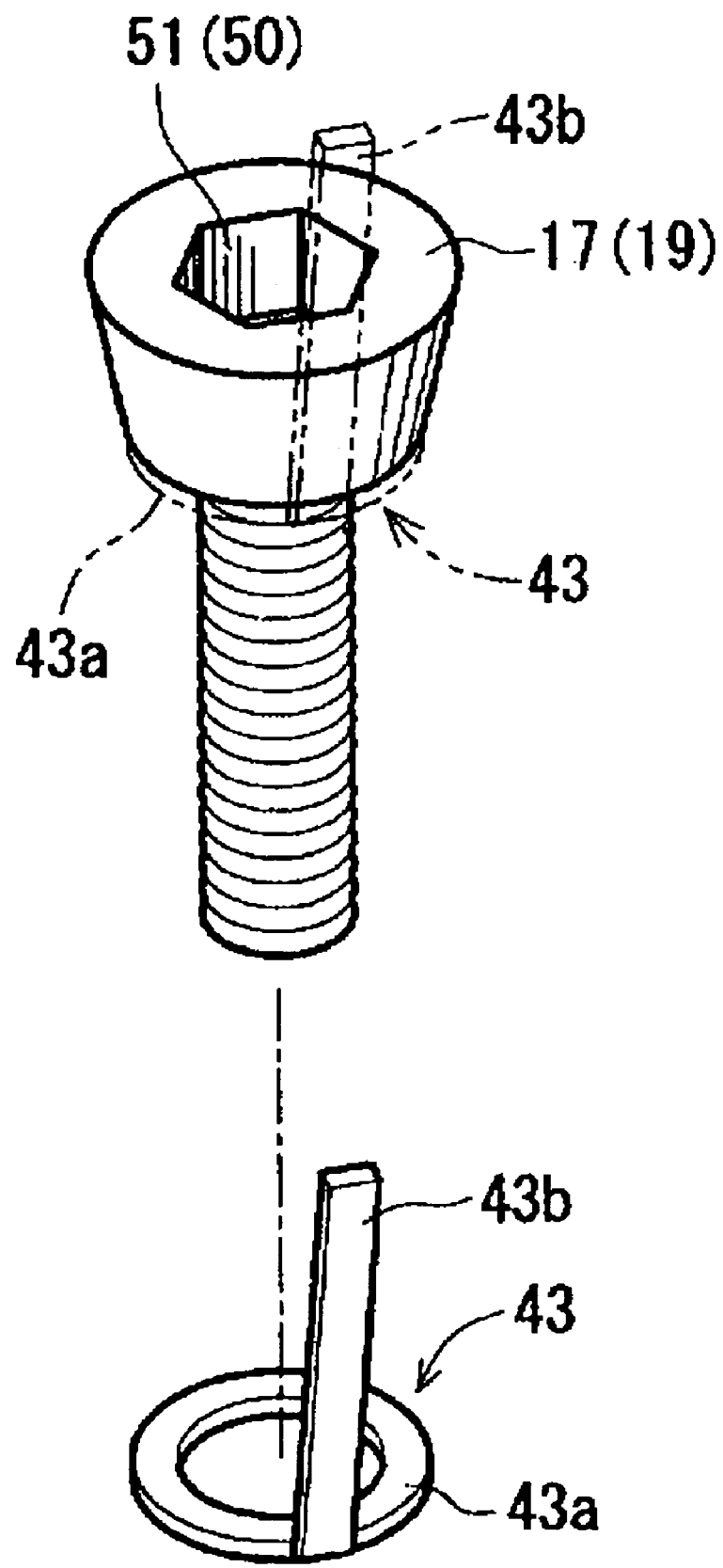
FIG. 9 is an exploded perspective view showing another embodiment of sealing means.
Figure 10:
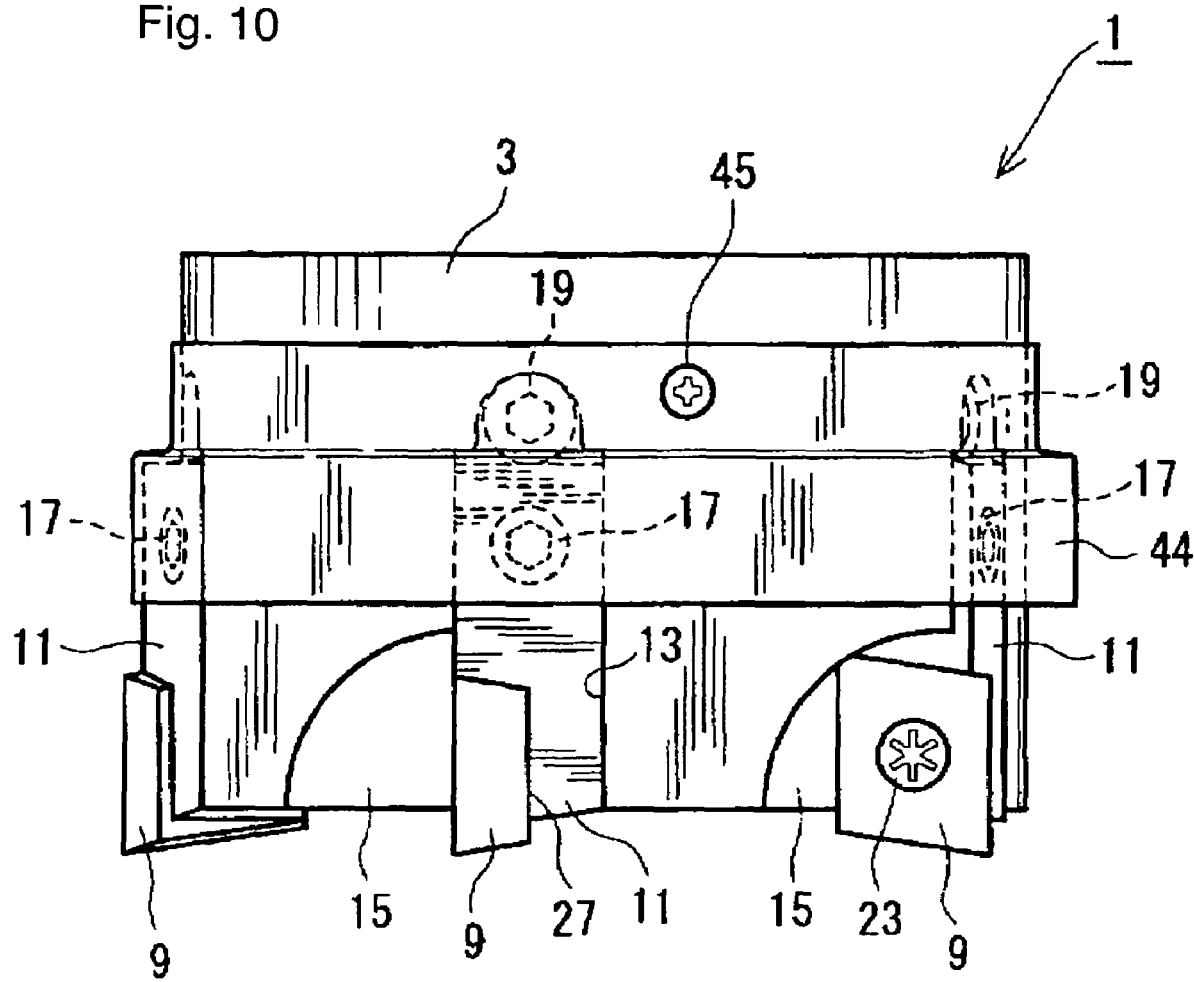
FIG. 10 is a front view showing a further embodiment of the sealing means.

(4) A sealer 43 as shown in FIG. 9 may be used as means for sealing the wrench reception socket 50 (51). The sealer 43 includes a washer-like ring element 43a and a metallic sealing element 43b standing on the ring element 43a. The wrench reception socket 50 (51) can be readily sealed by folding the sealing element 43b thereinto. As shown in FIG. 10, a sealing sleeve 44 may be fixedly fitted onto the cutter body member 3 by use of a machine screw 45 so as to seal the wrench reception sockets 50 and 51. The sealing sleeve 44 may be formed of material other than metal, such as rubber or synthetic resin.

Figure 11:
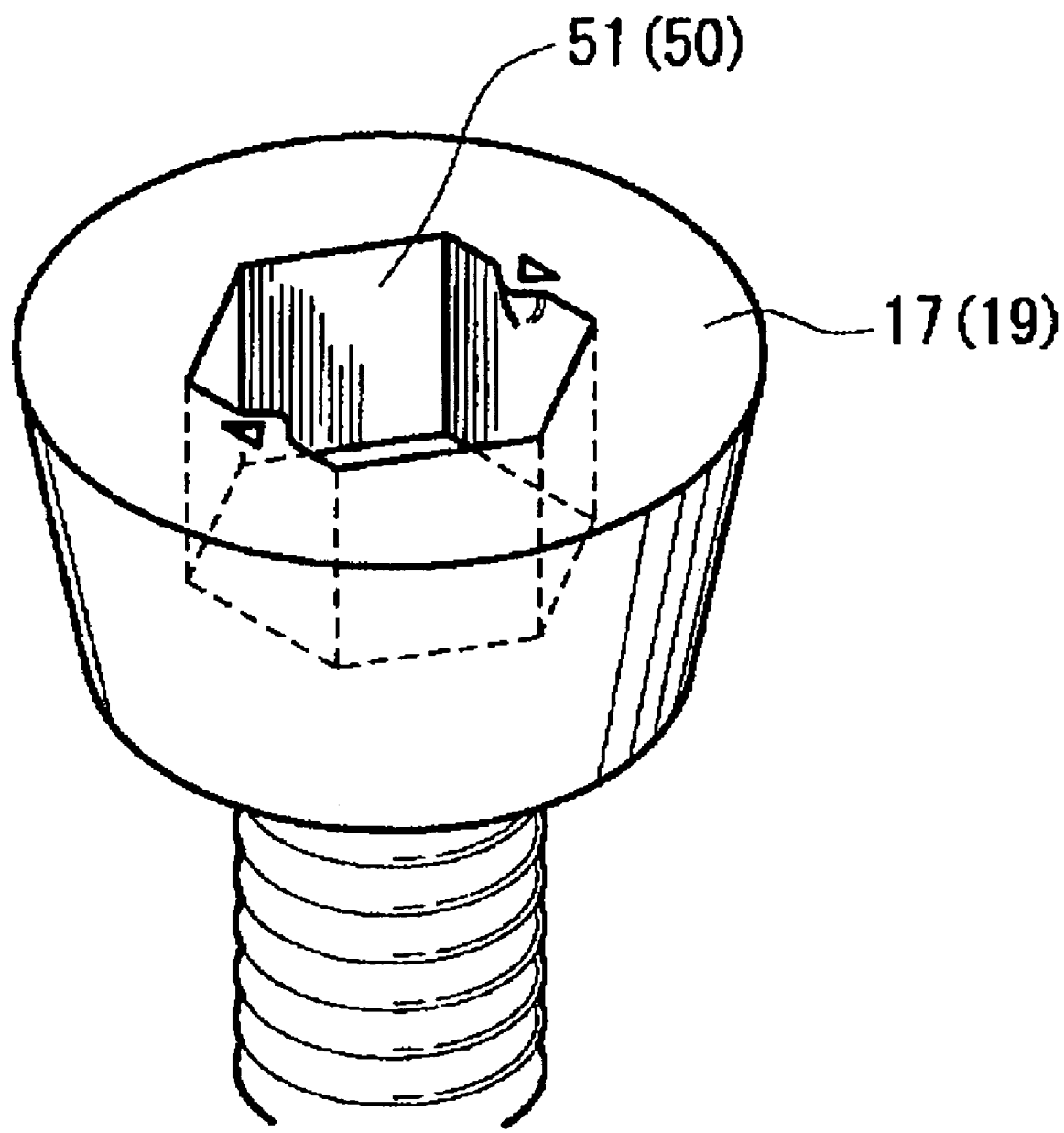
FIG. 11 is a partially enlarged perspective view showing the wrench reception socket in a deformed condition.
Figure 12:
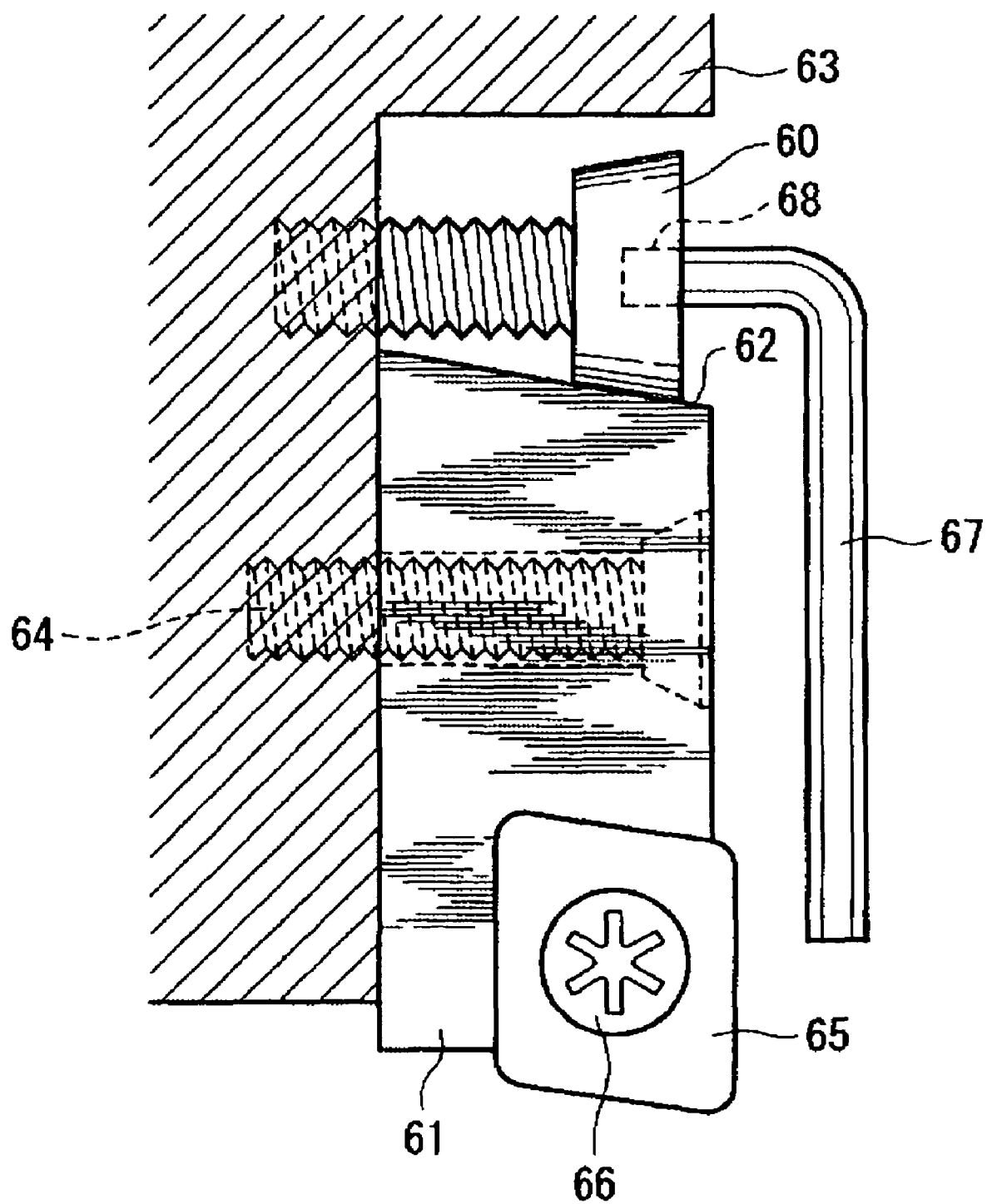
FIG. 12 is an enlarged sectional view showing a main portion of a conventional milling cutter.

(5) The wrench reception socket 50 (51) may be deformed by applying heat or pressure (see FIG. 11) so as to be sealed. FIG. 11 shows an example of pressure-applied plastic deformation of the wrench reception socket 50 (51). However, the wrench reception socket 50 (51) may be deformed by means of cutting.

(6) In the above-described embodiment, the same sealing means is applied to the two kinds of wrench reception sockets 50 and 51. However, the present invention is not limited thereto. Different sealing means may be combined as appropriate; for example, the wrench reception socket 50 is sealed with the resin 52, whereas the wrench reception socket 51 is sealed by means of deformation.

(7) In the above-described embodiment, the reception hole 39 assumes the form of a blind hole. However, a through-hole may be provided as the reception hole 39.

(8) The reception hole 39 may assume the form of a hole whose diameter is similar to the outside diameter of the insert attachment screw 23, instead of the form of a hole that is greater in diameter than the insert attachment screw 23. Although unillustrated, a threaded hole to be engaged with the insert attachment screw 23 may be provided as the reception hole 39.

(9) In the above-described embodiment, the insert 9 has a diamond cutting edge joined to its corner. However, the present invention is not limited thereto. The cutting edge may be formed of a carbide tool material or a carbide tool material coated with diamond.

(10) The above embodiment is described while mentioning the milling cutter 1 configured such that the inserts 9 and members (cartridges 11) for allowing the corresponding inserts 9 to be attached thereto are attached to the cutter body member 3. However, the cutter body 1a, which results from removal of the inserts 9 from the milling cutter 1, assumes a configuration similar to that of the milling cutter 1 of the above-described embodiment except that the inserts 9 are not provided.

In the above-described embodiment, the wrench reception sockets 50 and 51 are sealed to thereby prevent accidental movement of an adjustment screw or a cartridge fixation screw. However, the following means may be employed in order to solve such a problem.

The cutter body 1a includes the cartridges 11 for allowing the corresponding cutting inserts 9 to be removably fixed thereto by use of the corresponding first screws (insert attachment screws 23), the cutter body member 3, the second screws (cartridge fixation screws 17) for fixing the corresponding cartridges 11 to the cutter body member 3, and the adjustment screws 19 for adjusting the position of the corresponding cartridges 11. The cutter body 1a is configured such that the wrench reception socket 51 of each of the second screws (cartridge fixation screws 17) and the wrench reception socket 50 of each of the adjustment screws 19 assume a shape that does not fit a wrench for use with the first screws (insert attachment screws 23) and fits only a wrench other than an Allen wrench, a Phillips screwdriver, and a flat-tip screwdriver. When the shape of the wrench reception sockets 50 and 51 is set as above to, for example, a polygon that is not specified in a standard engineering specification (e.g., JIS), this means that the wrench reception sockets 50 and 51 only accept a dedicated wrench having a special shape, which is not used for ordinary applications. Thus, an effect equivalent to the effect of sealing is obtained in relation to the above-mentioned wrenches of ordinary use.

This application is based on Japanese Patent Application Nos. 2004-41229 filed Feb. 18, 2004 and 2003-86390 filed Mar. 26, 2003, the above-noted applications incorporated herein by reference in their entirety.

What is claimed is:

1. A cutter body comprising a cartridge for allowing a cutting insert to be removably fixed thereto, a cutter body member, a fastening screw for fixing the cartridge to the cutter body member, and an adjustment screw for adjusting the position of the cartridge, wherein one or both of a wrench reception socket of the fastening second screw and a wrench reception socket of the adjustment-completed adjustment screw is sealed, and the sealed wrench reception socket of said fastening and/or adjustment screw can be unsealed for readjustment and resealed as needed.

2. The cutter body as claimed in claim 1, wherein one or both of the wrench reception socket of the fastening screw and the wrench reception socket of the adjustment screw is sealed with a resin.

3. The cutter body as claimed in claim 2, wherein one or both of the wrench reception socket of the fastening screw and the wrench reception socket of the adjustment screw is roughened on at least an inner wall surface thereof.

4. The cutter body as claimed in claim 2, wherein one or both of the wrench reception socket of the fastening screw and the wrench reception socket of the adjustment screw is narrowed toward an opening thereof.

5. A rotary tool comprising the cutter body as claimed in claim 1 and a cutting insert fixed to the cartridge of the cutter body.

6. The rotary tool as claimed in claim 5, wherein a cutting edge of the cutting insert is formed of diamond.

7. The rotary tool as claimed in claim 5, for use in cutting an aluminum workpiece.

8. A method for assembling a rotary tool as claimed in claim 5, which comprises fixing the cutting insert to the cartridge, fixing the cartridge to the cutter body member by use of the fastening screw, adjusting the position of the cartridge by use of the adjustment screw, and sealing one or both of the wrench reception socket of the fastening screw and the adjustment screw, wherein the sealing step is performed after the cartridge fixation step and/or the adjustment step.

* * * * *